United States Patent
McCoy et al.

(10) Patent No.: US 9,942,541 B2
(45) Date of Patent: Apr. 10, 2018

(54) METHOD AND APPARATUS FOR SYNCHRONIZING OF 3-D DISPLAY DEVICES

(71) Applicants: Sony Corporation, Tokyo (JP); Sony Network Entertainment International LLC, Los Angeles, CA (US)

(72) Inventors: Charles McCoy, Coronado, CA (US); Ling Jung Wong, Champaign, IL (US); True Xiong, San Diego, CA (US)

(73) Assignees: SONY NETWORK ENTERTAINMENT INTERNATIONAL LLC, Los Angeles, CA (US); SONY CORPORATION, Tokyo (JP)

( * ) Notice: Subject to any disclaimer, the term of this patent is extended or adjusted under 35 U.S.C. 154(b) by 235 days.

(21) Appl. No.: 13/705,493

(22) Filed: Dec. 5, 2012

(65) Prior Publication Data
US 2014/0152784 A1     Jun. 5, 2014

(51) Int. Cl.
*H04N 13/04*     (2006.01)
*H04N 13/00*     (2006.01)

(52) U.S. Cl.
CPC ..... *H04N 13/0497* (2013.01); *H04N 13/0051* (2013.01); *H04N 13/0059* (2013.01)

(58) Field of Classification Search
CPC .......... H04N 13/0497; H04N 13/0051; H04N 13/0059
USPC .......................................................... 348/52
See application file for complete search history.

(56) References Cited

U.S. PATENT DOCUMENTS

| | | | |
|---|---|---|---|
| 2008/0291891 A1* | 11/2008 | Jerlhagen | H04L 43/0864 370/350 |
| 2009/0086764 A1 | 4/2009 | Lee et al. | |
| 2009/0109282 A1* | 4/2009 | Schnebly | G02B 27/2242 348/55 |
| 2011/0025821 A1* | 2/2011 | Curtis et al. | 348/43 |
| 2011/0164118 A1* | 7/2011 | Choi | H04N 13/0497 348/51 |
| 2012/0169852 A1* | 7/2012 | Seo | H04N 13/0497 348/56 |

(Continued)

FOREIGN PATENT DOCUMENTS

| | | |
|---|---|---|
| CN | 102196284 A | 9/2011 |
| CN | 102595160 A | 7/2012 |
| JP | 2010-62767 A | 3/2010 |

(Continued)

OTHER PUBLICATIONS

Bisdikian, "An Overview of the Bluetooth Wireless Technology," IEEE Communications Magazine, Dec. 2001, pp. 87-94.*

(Continued)

*Primary Examiner* — Thai Tran
*Assistant Examiner* — Christopher T Braniff
(74) *Attorney, Agent, or Firm* — Chip Law Group

(57) ABSTRACT

Method and apparatus for generating a synchronization signal for a plurality of three-dimensional (3-D) image display devices is disclosed. The method and apparatus includes a synchronization manager configured for generating the synchronization signal utilized by the plurality of 3-D display devices for synchronously displaying respective content in accordance with a timing signal associated with the synchronization signal.

20 Claims, 7 Drawing Sheets

(56) References Cited

U.S. PATENT DOCUMENTS

2013/0194399 A1* 8/2013 Wirtz ................ H04N 13/0438
348/53

FOREIGN PATENT DOCUMENTS

| JP | 2011-188232 A | 9/2011 |
| JP | 2011-199872 A | 10/2011 |
| WO | 2011/070743 A1 | 6/2011 |

OTHER PUBLICATIONS

Chinese Office Action dated Apr. 7, 2015 in patent application No. 201310637390.9.
Office Action Received for Korean Patent Application No. 10-2013-0148716 dated Feb. 23, 2015.

* cited by examiner

METHOD AND APPARATUS FOR SYNCHRONIZING OF 3-D DISPLAY DEVICES

FIELD

Certain embodiments of the disclosure relate to 3-D display devices. More specifically, certain embodiments of the disclosure relate to method and apparatus for synchronizing a plurality of 3-Dimensional (3-D) display devices.

BACKGROUND

Three-dimensional (3-D) display devices simultaneously display two sets of images with a parallax between the images on a display screen, so that a user can watch the two sets of images through the left eye and the right eye respectively to perceive 3D images. Current 3D display technologies require a 3D video source to include multiple sets of images with parallax. In general, active stereo 3D stereoscopic technology involves the use of shutter glasses for producing the 3D effect for the user. In active stereo 3D stereoscopic technology, a three-dimensional (3-D) display device alternately displays video content as a left image and a right image of a frame at a predefined rate, e.g., 24, 30, 48, or 60 frames per second. To enable a user to see a 3-D image, the shutter glasses block light to each appropriate eye when the converse eye's image is displayed on the 3-D display device. As such, the shuttering rate of the shutter glasses is synchronized with the frame rate of the 3-D display device. Further, the rate at which the 3-D display device switches between the left and right images is synchronized with the rate at which the shutter glasses shutter (switch between) the left eye and the right eye.

A plurality of 3-D display devices may switch between the left images and the right images of their respective 3-D content at different time instants and/or at different rates. Therefore, shutter glasses associated with a first 3-D display device might not be synchronized with other 3-D display devices in the same room. As such, a user can only watch 3-D content on the 3-D display device that is synchronized with the shutter glasses worn by the user. Thus, there is a need for synchronizing a plurality of 3-D display devices so that a user wearing the 3-D content viewing device enjoys a seamless 3-D viewing experience across the plurality of 3-D display devices.

SUMMARY

An apparatus and method for synchronizing of 3-D display devices, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
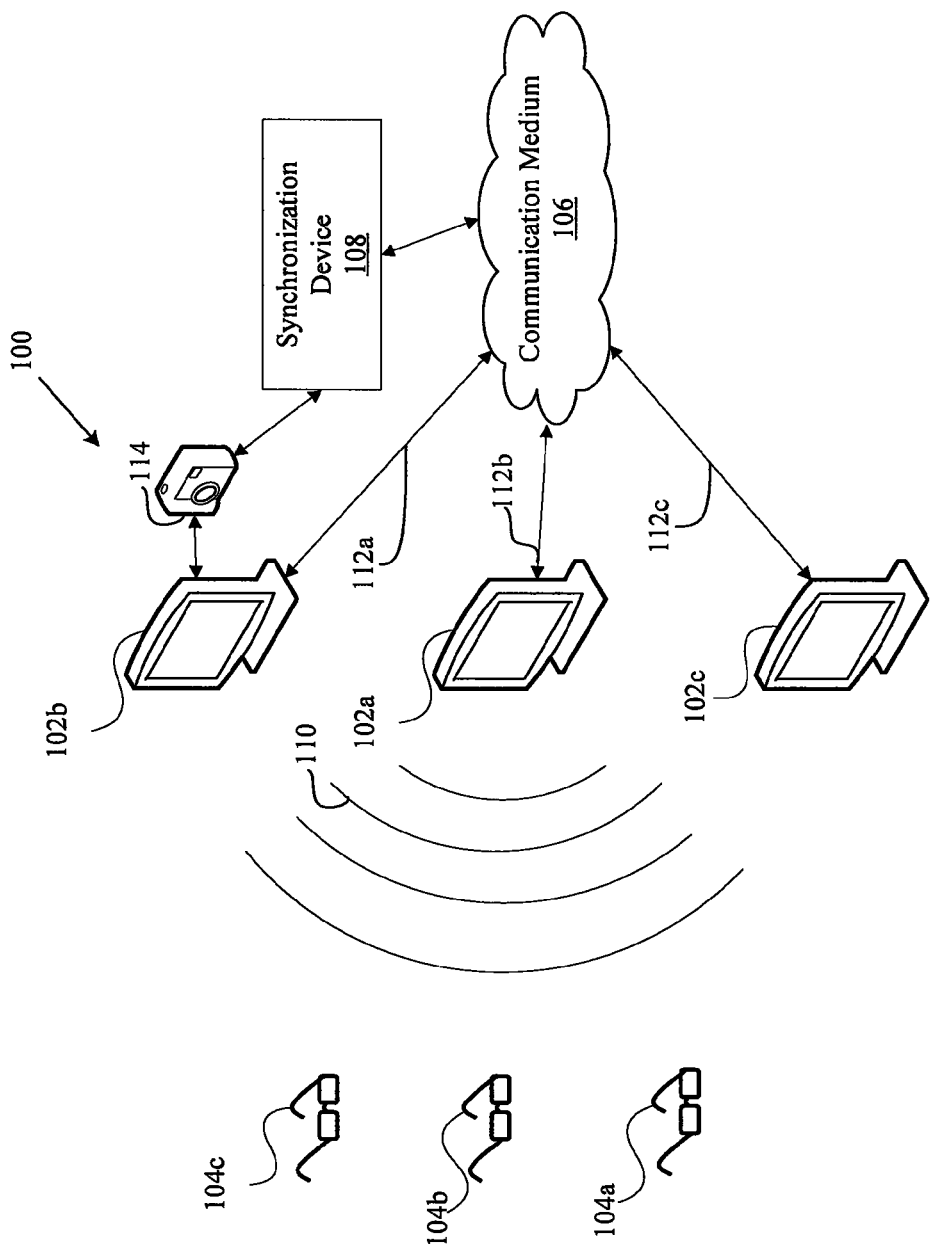
FIG. 1 is a block diagram of a system environment, in which, the present disclosure may be implemented in accordance with an embodiment.

The disclosed embodiments can be best understood with reference to the figures and the detailed description set forth herein. Various embodiments are discussed below with reference to the figures. However, those skilled in the art will readily appreciate that the detailed description given herein with respect to these figures is just for explanatory purposes as the disclosed methods and systems extend beyond the described embodiments.

Definition Of Terms:

3-D content: 3-D content correspond to content that, when viewed, provides an illusion of depth. The 3-D content comprises video frames that include right images and left images. In active stereo 3-D technology, when the 3-D content is viewed through a 3-D viewing device, e.g., shutter glasses, the left images are displayed to the left eye while light to the right eye is blocked. Similarly, the right images are displayed to the right eye while blocking the left eye. Such switching between right images and left images creates parallax that in turn creates an illusion of 3-D depth in the displayed imagery.

Timing signal: refers to a time instant at which a 3-D display device switches between a right image and a left image. Further, it may be noted that if two 3-D display devices operate according to the same timing signal, then frequency and the instant of switching (phase) between the left images and the right images in the two devices are same. For example, a first 3-D display device displays switches between left images and right images after every 1 ms and at time instant $t_1$. A second display device will operate in accordance with the same timing signal as the first display device if the second display device switches between left images and right images after every 1 ms at an instant $t_1+n$ milliseconds (where n=0, 1, 2, 3).

3-D display device: refers to a device that displays a 3-D content by alternating the display of images for the left eye and images for the right eye for viewing with shutter glasses.

Synchronization device: refers to a device that generates and transmits a synchronization signal to one or more devices (e.g. 3-D display devices, DVD players, Blu-ray disc players, and the like). The transmission can be via a wired communication medium or a wireless communication medium.

Master display device: Master display device corresponds to a device that includes a 3-D display device and a synchronization device that is generating the timing signal used by the 3-D display device. Further, the master display device transmits the synchronization signal to one or more slave display devices.

Slave display device: Slave display device corresponds to a 3-D display device that is synchronized to a timing signal from an external synchronization device. In an embodiment, a slave display device may include a synchronization device, but receives the timing signal from an external synchronization device.

Synchronization signal: Synchronization signal corresponds to a signal generated and transmitted by a synchronization device to one or more other devices. Synchronization signal includes information to derive a timing signal for displaying 3-D content. The one or more other devices receive and utilize the synchronization signal to determine the timing signal in order to adjust the display of respective 3-D content. A synchronization device can transmit the synchronization signal periodically or responsive to a request.

Glasses control signal: refers to a signal that is transmitted to the shutter glasses to control the synchronization of the shutter glasses. In an embodiment, a 3-D display device can transmit glasses control signals. In another embodiment, a synchronization device can transmit the glasses control signals. One or more 3-D display devices may monitor and synchronize to a detected glasses control signal.

The present disclosure proposes methods and apparatuses for synchronizing a plurality of 3-D display devices. A synchronization device generates and transmits a synchronization signal to the plurality of 3-D display devices. Each of the plurality of 3-D display devices utilizes the synchronization signal to display content in accordance with a timing signal associated with the synchronization signal.

FIG. 1 is a block diagram of a system environment 100, in which, the present disclosure may be implemented in accordance with an embodiment. The system environment 100 includes a plurality of 3-D display devices 102a, 102b, and 102c, (hereinafter referred to 3-D display devices 102), a plurality of 3-D content viewing devices 104a, 104b, and 104c (hereinafter referred to 3-D content viewing devices 104), a communication medium 106, and a synchronization device 108. The 3-D display devices (for example, 102a) are configured to transmit glasses control signals 110. The synchronization device 108 generates and transmits a synchronization signal (for example, 112a, 112b, 112c). The system environment 100 further includes a visual detector 114 communicatively coupled to one of the 3-D display devices (for example, 102b).

The 3-D display devices 102 correspond to computing or multimedia devices capable of displaying 3-D content and conveying a stereoscopic perception of depth. Examples of the 3-D display device may include laptops, televisions (TV), tablet computers, desktops, mobile phones, projectors, and other such devices that have 3-D content displaying capabilities. In one embodiment, the 3-D display devices 102 receive 3-D content from a service provider (not shown). The service provider may aggregate and transmit the 3-D content to the 3-D display devices 102 in accordance with various digital transmission protocols such as, but are not limited to, Digital Terrestrial Television (DTV) and Internet Protocol Television (IPTV). In another embodiment, the 3-D display devices 102 may receive 3-D content from one or more 3-D content playback devices such as DVD players, CD players, and USB storage devices. In an embodiment, the 3-D display devices 102 may not have an internal display capability but may have a display screen external to the 3-D display device 102. For example, the 3-D display devices 102 can be DVD players, CD players, Blu-ray disc players, etc. that do not have an internal display capability but can send 3-D content to a television or a display device.

The 3-D content viewing devices 104 (for example, shutter glasses) are associated with at least one of the 3-D display devices 102 (e.g., 102a). In an embodiment, the 3-D content viewing devices 104 may include a liquid crystal glasses that allow light through in synchronization with the images displayed on the 3-D display devices 102.

In an embodiment, the communication medium 106 corresponds to a medium through which the content and the messages flow between the various components (e.g., the 3-D display devices 102, the plurality 3-D content viewing devices 104, and the synchronization device 108) of the system environment 100. Communication medium 106 may comprise one or more networks such that various signals may propagate to/from the display devices 102. For example, in one embodiment, the content may arrive at the display devices 102 though a first network and a second network may carry synchronization signals from the synchronization device 108 to the display devices 102. Examples of such a first network may include, IPTV, CATV, Cable TV, etc. Examples of a second network may include, but are not limited to, Bluetooth Network, Infra Red Network, a Wireless Fidelity (WiFi) network, a Wireless Area Network (WAN), a Local Area Network (LAN) or a Metropolitan Area Network (MAN). Various devices in the system environment 100 can connect to the communication medium 106 in accordance with various wired and wireless communication protocols such as Transmission Control Protocol and Internet Protocol (TCP/IP), User Datagram Protocol (UDP), 2G, 3G or 4 G communication protocols. In an embodiment, the first network and the second network can be same. In an embodiment, the communication medium 106 can be a dedicated network (wired or wireless). Such dedicated network may be created by the synchronization device 108 or by an external device such as a network switch or a router. Such a dedicated network can typically include the synchronization device 108 and 3-D display devices 102.

In an embodiment, the synchronization device 108 generates a synchronization signal that is transmitted to the 3-D display devices (for example, 102a and 102c). The synchronization device 108 may also generate and transmit the glasses control signals 110 to the 3-D content viewing devices 104. In various embodiments, portable devices such as, but not limited to, a set-top box, a remote control device, a synchronization server, a mobile device, a gaming console, a gaming controller, a router, a network switch, any network device, and the like can implement the synchronization device 108. In an embodiment, one or more of 3-D display devices 102 may include the synchronization device 108. The synchronization device 108 is described in detail in conjunction with FIG. 2.

In some embodiments, to ensure the synchronization device 108 ensures all left images are displayed at the same time, then all right images, the device 108 needs a reference for left/right images. Such a reference may be contained in or extracted from the content, or an external detector may be used to generate such a reference. The visual detector 114 may be used for this purpose. The visual detector 114 can be any image capturing or video capturing device, such as, a high precision camera that detects very precise timing information but may be limited in the visual information detected. The detector 114 is positioned to image a 3-D display device 102a or 102c to facilitate deriving a left/right reference signal. In an embodiment, the visual detector 114 is coupled to a 3-D display device (for example, 102b). The visual detector 114 may also be directly coupled to the synchronization device 108 or via the network 106. Either the detector 114, the synchronization device 108 or the display device 102b, analyzes the detector output to determine a left/right reference signal. If the content of the display devices 102b or 10c are the same, the analysis matches the images viewed by the visual detector 114 with those images being displayed. If the content captured by the visual detector 114 is different than content displayed on various display devices 102b, 102c to be synchronized, an analysis of foreground and background imagery may be used to determine right and left images within the content without knowledge of the content itself.

Figure 2:
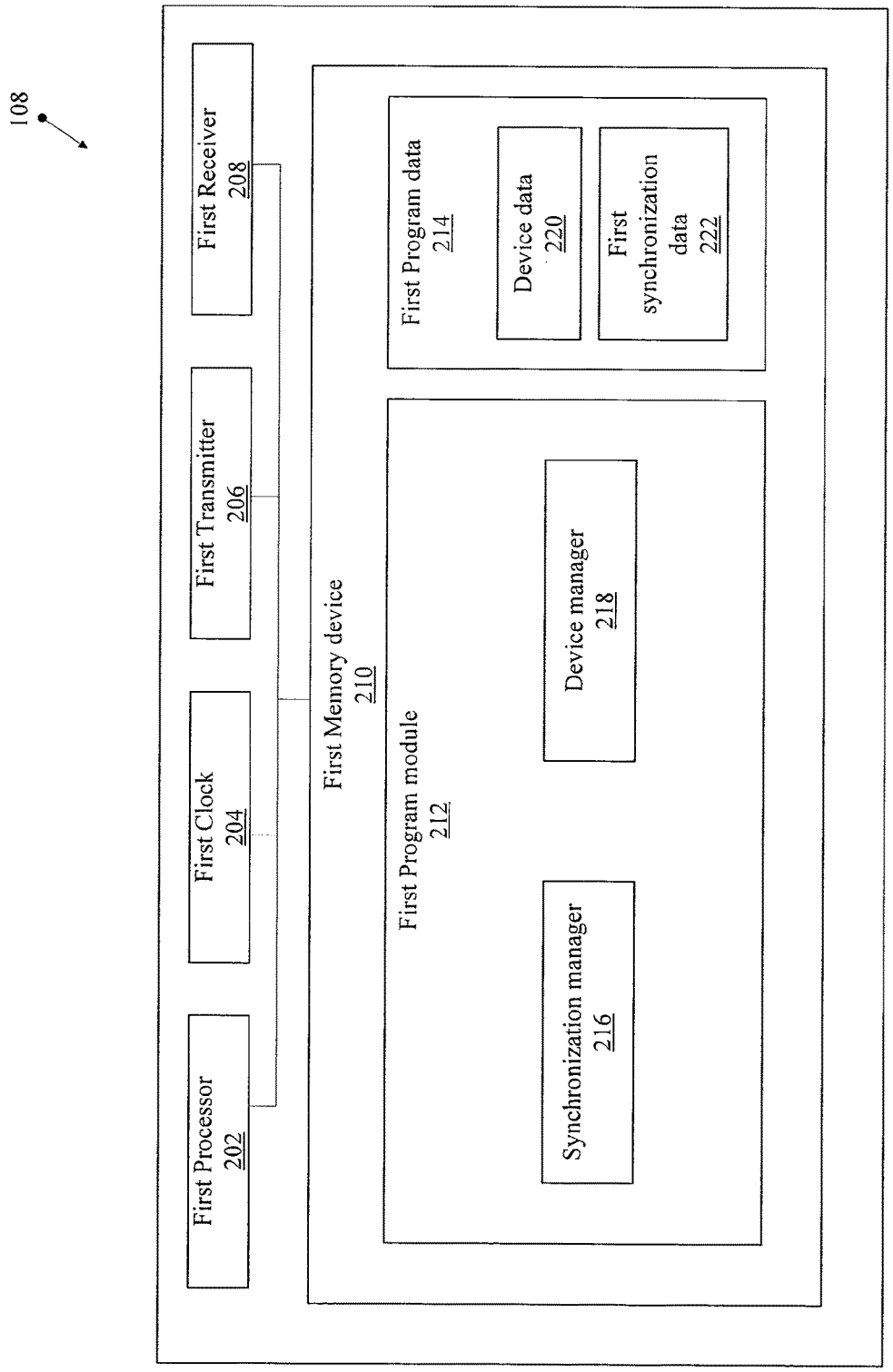
FIG. 2 is a block diagram of a synchronization device in accordance with an embodiment.

FIG. 2 is a block diagram of the synchronization device 108 in accordance with an embodiment. The synchronization device 108 includes a first processor 202 coupled to a first clock 204, a first transmitter 206, a first receiver 208, and a first memory device 210. The first processor 202 executes a set of instructions stored in the first memory device 210. The first processor 202 can be realized through a number of processor technologies known in the art. Examples of the first processor 202 can include, but is not limited to, X86 processor, RISC processor, ASIC processor, CSIC processor, ARM processor, or any other processor. Although the first processor 202 may be a portion of a general purpose computing device, when executing the instructions, the general purpose computing device becomes a specific purpose computing device performing the function(s) defined by the instructions.

In an embodiment, the first clock 204 generates a synchronization signal 112a that is transmitted to the 3-D display devices 102 (refer to FIG. 1). The first clock 204 may be realized by various technologies known in the art such as quartz crystal oscillator, and Phase-Locked Loop (PLL) clock.

The first transmitter 206 transmits the synchronization signal 112a to other components of the system environment 100 (e.g. the 3-D display devices 102). Examples of the first transmitter 206 can include, but are not limited to, an antenna, an Ethernet port, a HDMI port, a USB port or any port that can be configured to transmit the synchronization signal. The first transmitter 206 transmits the synchronization signal in accordance with various communication protocols, such as, Transmission Control Protocol and Internet Protocol (TCP/IP), User Datagram Protocol (UDP), 2G, 3G, 4G, Bluetooth, Zigbee, and infrared communication protocols. In an embodiment, the first transmitter 206 may include multiple transmitters to support transmissions using multiple communication protocols. In an embodiment, the first transmitter 206 may implement a wired or a wireless technology.

The first receiver 208 receives signals from 3-D display devices 102. The first receiver 208 receives data and/or signals in accordance with various communication protocols, such as, Transmission Control Protocol and Internet Protocol (TCP/IP), User Datagram Protocol (UDP), 2G, 3G, 4G, Bluetooth, Zigbee, infrared communication protocols, DVD, CATV, and Cable TV. In an embodiment, the first receiver 208 may implement a wired or a wireless technology.

The first memory device 210 stores a set of instructions and data. Some of the commonly known memory device implementations can be, but are not limited to, a random access memory (RAM), read only memory (ROM), hard disk drive (HDD), and secure digital (SD) card. The first memory device 210 includes a first program module 212 and a first program data 214. The first program module 212 includes a set of instructions that can be executed by the first processor 202 to perform specific actions on the synchronization device 108. The first program module 212 further includes a synchronization manager 216 and a device manager 218. Although, various modules in the first program module 212 have been shown in separate blocks, it may be appreciated that one or more of the modules may be implemented as an integrated module performing the combined functions of the constituent modules. The first program data 214 includes device data 220, and first synchronization data 222.

The synchronization manager 216 triggers the first clock 204 to generate the synchronization signal. In another embodiment, the synchronization manager 216 may use a glasses control signal 110 generated by a 3-D display device 102a to generate the synchronization signal 112. In another embodiment, the synchronization manager 216 generates the synchronization signal 112 based on 3-D content received at the synchronization device 108.

The device manager 218 manages registration of one or more 3-D display devices 102. In an embodiment, the device manager 218 assigns IDs and saves information (communication protocol, paring keys, etc) for transmitting the synchronization signal 112 to the registered devices individually. Such information is stored in device data 220.

It may be appreciated that the synchronization device 108 can include additional hardware and software components to enable additional functions, such as, user based configurations, reset operations, device upgrade operations, etc.

Figure 3:
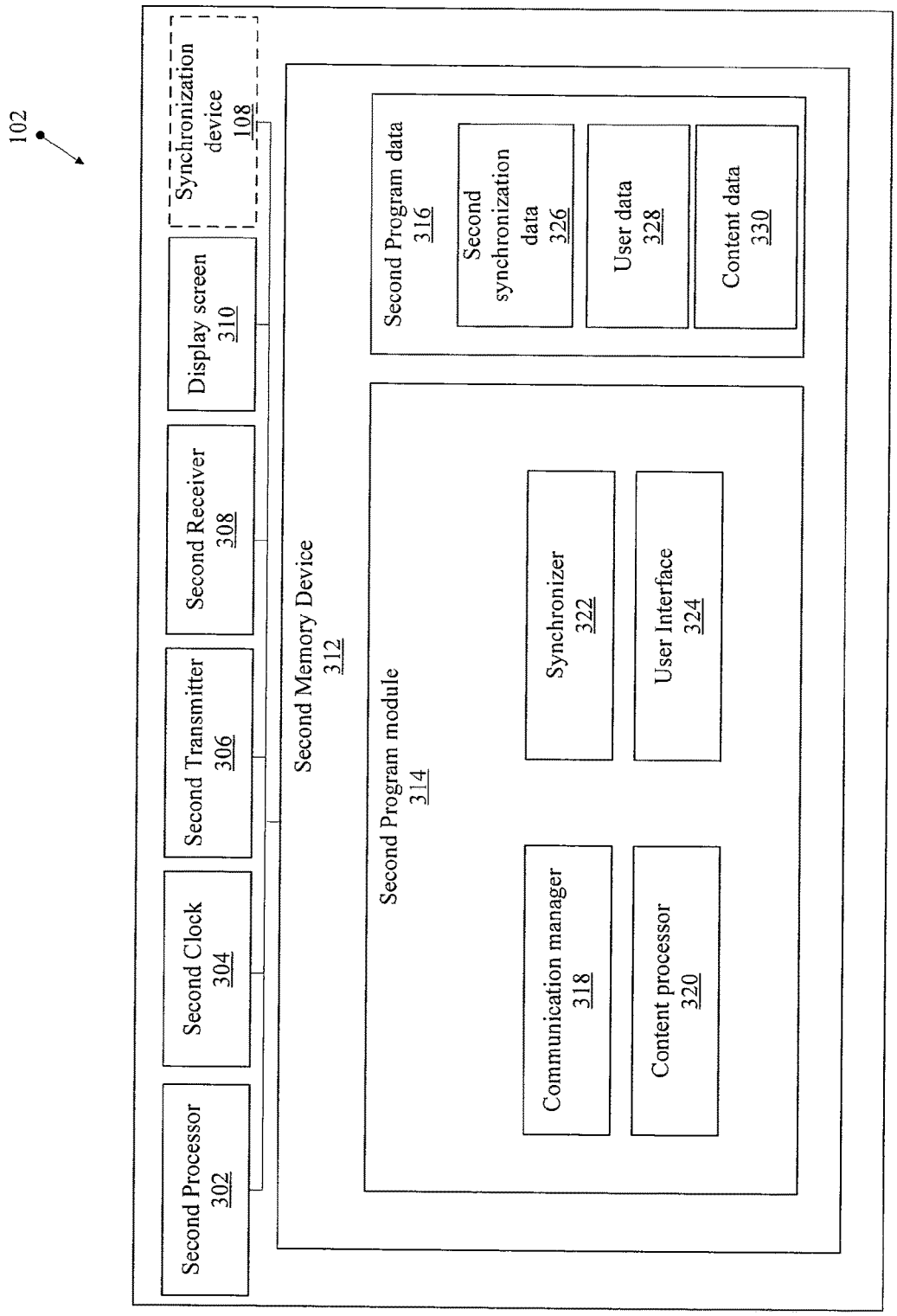
FIG. 3 is a block diagram of a 3-D display device in accordance with an embodiment.

FIG. 3 is a block diagram of a 3-D display device 102a in accordance with an embodiment. The 3-D display device 102a includes a second processor 302 coupled to a second clock 304, a second transmitter 306, a second receiver 308, a display screen 310, and a second memory device 312. FIG. 3 will be described in conjunction with FIG. 1 and FIG. 2.

The second processor 302 executes a set of instructions stored in the second memory device 312. The second processor 302 can be realized through a number of processor technologies known in the art. Examples of the second processor 302 can include, but is not limited to, X86 processor, RISC processor, ASIC processor, CSIC processor, ARM processor, or any other processor. Although the second processor 302 may be a portion of a general purpose computing device, when executing the instructions, the general purpose computing device becomes a specific purpose computing device performing the function(s) defined by the instructions.

In an embodiment, the second clock 304 generates a default timing signal that is utilized by the 3-D display device 102a to adjust the respective 3-D content. The second clock 304 may be realized by various technologies known in the art such as quartz crystal oscillator, and Phase-Locked Loop (PLL) clock.

The second transmitter 306 transmits data or signals to other components of the system environment 100 (e.g. the 3-D content viewing devices 104, the 3-D display device 102c). Examples of the second transmitter 306 can include, but are not limited to, an antenna, an infrared transmitter, an Ethernet port, a HDMI port, a USB port or any port that can be configured to transmit the synchronization signal. The second transmitter 306 transmits the data and signals in accordance with various communication protocols, such as, Transmission Control Protocol and Internet Protocol (TCP/IP), User Datagram Protocol (UDP), 2G, 3G, 4G, Bluetooth, Zigbee, and infrared communication protocols. In an embodiment, the second transmitter 306 may include multiple transmitters to support transmissions using multiple communication protocols. In an embodiment, the second transmitter 306 may implement a wired or a wireless technology.

The second receiver 308 receives 3-D content from the content provider. The second receiver 308 receives a synchronization signal (for example, 112b) from the synchronization device 108 (Refer FIG. 1). Examples of the second receiver 308 includes, but are not limited to, an antenna, an Ethernet port, a HDMI port, a USB port, an infrared receiver, or any port that can be configured to receive the synchronization signal. The second receiver 308 receives the synchronization signal in accordance with various communication protocols, such as, Transmission Control Protocol and Internet Protocol (TCP/IP), User Datagram Protocol (UDP), 2G, 3G and 4 G communication protocols.

In an embodiment, the display screen 310 may display 3-D content or a user interface. The display screen 310 can be realized through several known technologies, such as, Cathode Ray Tube (CRT) based display, Liquid Crystal Display (LCD), Light Emitting Diode (LED)-based display, Organic LED display technology, and Retina Display technology. Further, the display screen 310 can be a touch screen that receives a user input. In another embodiment, the display screen can be a projector. In an embodiment, the display screen 310 may be external to the 3-D display device 102a. In such an embodiment, the display device 102 outputs the 3-D content to the display screen or display device along with the synchronization signal 112b such that the receiving device can display with the content using the corresponding timing signal. For example, a Blu-ray disc player may set the timing signal to be aligned with other 3-D display devices (for example, 102b, 102c) and may include the timing signal in the signal the player outputs to a 3-D rendering device or television.

The second memory device 312 can be implemented in a manner similar to the first memory device 210 in the synchronization device 108. The second memory device 312 includes a second program module 314 and a second program data 316. The second program module 314 includes a communication manager 318, a content processor 320, a synchronizer 322, and a user interface 324. The second program data 316 includes second synchronization data 326, user data 328 and content data 330.

The communication manager 318 may establish and/or maintain connection between the 3-D display device 102 and the synchronization device 108. Further, the communication manager 318 manages communication between the 3-D display devices 102 and at least one 3-D content viewing device (e.g. 104a). The communication manager 318 also manages the reception of 3-D content from a content provider. In an embodiment, the communication manager 318 also manages the reception of synchronization signal 112 from the synchronization device 108. In another embodiment, the communication manager 318 monitors any glasses control signal if the synchronization signal 112b is not received. The communication manager 318 further manages reception of image data or video feed from an external device (for example, the visual detector 114).

The content processor 320 processes the 3-D content received from a content provider. The content processor 320 decodes a video content signal and buffers the left images and the right images of the frames in the content data 330 prior to the display of the 3-D content. Further, the content processor 320 displays the left images and the right images alternately on the display screen 310. Based on a given timing signal and switching rate, the content processor 320 alternately retrieves left and right images from the buffer and displays the left images and right images. For example, from the synchronization signal 112b, the content processor 320 determines the time instant and the rate for switching between the left image and the right image.

The synchronizer 322 extracts and stores the determined timing signal as the second synchronization data 326.

In an embodiment, the user interface 324 presents a user interface on the display screen 310. The user interface may receive a user input via one or more input devices (not shown) to change one or more settings associated with the 3-D display devices 102a. In an embodiment, the one or more settings may correspond to, but are not limited to, brightness, color, contrast, etc. Further, user interface stores all the user related data and user settings as the user data 328. In an embodiment, the user interface is optional for the 3-D display device 102a.

In an embodiment, the 3-D display device 102 includes the synchronization device 108. In such an embodiment, the 3-D display device 102 can be configured to function as a master device that performs some or all of the functions of the synchronization device 108. For example, the 3-D display device 102a may include the synchronization device 108. The 3-D display device 102a may generate and transmit the synchronization signal 112a. In such an embodiment, the 3-D display device 102a transmits the synchronization signal 112a to other 3-D display devices (for example, 102b and 102c). Further, the 3-D display device 102a may generate and transmit glasses control signals 110 based on the synchronization signal 112a.

In an embodiment, the synchronizer 322 can synchronize to another 3-D display device (for example, 102c) by intercepting the glasses control signals that the other 3-D display device 102c transmits to one or more 3-D content viewing devices 104. In yet another embodiment, the synchronizer 322 can process the video feed from the visual detector 114 to determine the timing signal associated with another 3-D display device (for example, 102c). Such video feed includes the timing information associated with the other 3-D display devices that can be utilized for synchronization by the 3-D display device 102a.

Figure 4A:
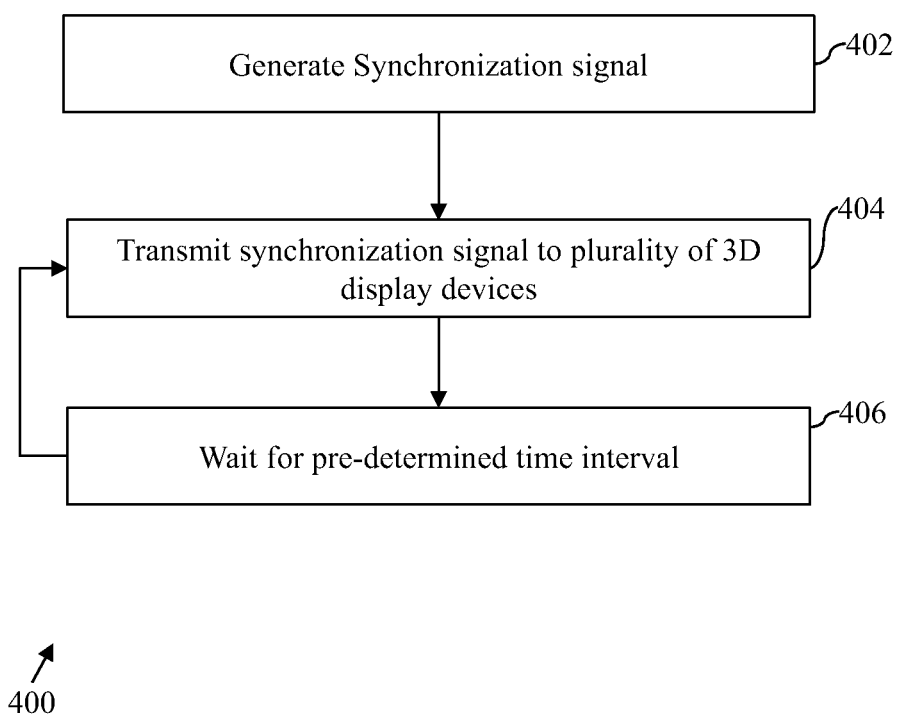
FIGS. 4a and 4b are methods implemented on a synchronization device in accordance with various embodiments.

FIG. 4a is a flowchart of a method 400, implemented in the synchronization device 108, for generating synchronization signal. The flowchart 400 is described in conjunction with FIG. 1, FIG. 2 and FIG. 3. At step 402, the synchronization manager 216 triggers the first clock 204 to generate a synchronization signal. In an embodiment, prior to generation of the synchronization signal 112a, the synchronization manager 216 may receive 3-D content from a content provider through the first receiver 208. The synchronization manager 216 may extract a timing signal associated with the 3-D content, i.e., may extract timing information regarding left-right image display. Such an embodiment may be implemented when the 3-D display devices (102a, 102b, and 102c) display the same 3-D content. In an embodiment, when the synchronization manager 216 is external to the 3-D display devices 102, the synchronizer manager 216 generates the synchronization signal 11a irrespective of the 3-D content. In yet another embodiment, the synchronization manager 216 monitors the glasses control signal 110 through the first receiver 208. Based on the glasses control signal 110, the synchronization manager 216 triggers the first clock 204 to generate the synchronization signal 112a. In an embodiment, the synchronization signal 112a is indicative of the timing signal and/or frame rate of (switching rate between) the left and right images of the 3-D content. The synchronization signal 112a is described below in conjunction with FIG. 5.

At step 404, the synchronization manager 216 transmits the synchronization signal 112a to the 3-D display devices 102 over the communication medium 106. In another embodiment, the synchronization manager 216 transmits the glasses control signal 110 to the 3-D content viewing devices 104 based on the synchronization signal 112a. In an embodiment, the first transmitter 206 may transmit the synchronization signal via a dedicated synchronization wire or via UDP multicast.

At step 406, the synchronization manager 216 waits for a predetermined time interval and again transmits the synchronization signal to the 3-D display devices 102. For example, the synchronization manager 216 transmits the synchronization signal to the display devices 102 after every 1 second. In an embodiment, the period for transmission of the synchronization signal may be predefined during the manufacturing of the synchronization device 108. In an alternative embodiment, the synchronization manager 216 may transmit the synchronization signal continuously. In an embodiment, the synchronization manager 216 transmits the synchronization signal to the 3-D display devices 102 in accordance with a daisy-chain signal transmission. For example, the synchronization device 108 transmits the synchronization signal to the 3-D display device 102a. The 3-D display device 102a relays the synchronization signal to the 3-D display device 102b and so forth.

Figure 4B:
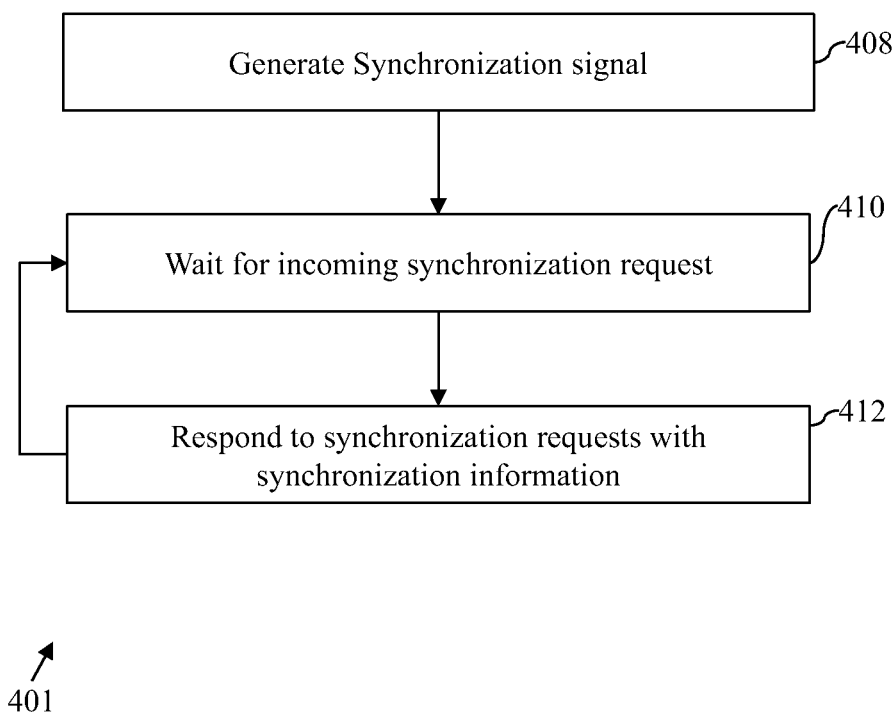

FIG. 4b is a flowchart of an alternative method 401, implemented in the synchronization device 108, for generating synchronization signal. At step 408, the synchronization manager 216 triggers the first clock 204 to generate the synchronization signal 112a.

At step 410, the synchronization manager 216 waits for an incoming synchronization request from a 3-D display device. In an embodiment, the 3-D display devices (second transmitter 306) transmit a request for the synchronization signal. The device manager 218 manages such requests and maps the same to respective device IDs stored in the device data 220.

At step 412, the synchronizer manager 216 responds to the incoming request by transmitting the synchronization signal 112a. In an embodiment, the synchronization manager 216 transmits the synchronization signal 112a using TCP/IP or Bluetooth communication protocols. It is to be noted that the 3-D display devices may register with the synchronization device 108 for receiving synchronization signals (for example, 112a, 112b, 112c, etc.). During such registration, the 3-D display devices 102 and the synchronization device 108 may pair up using various communication protocols to enable unicast transmission of synchronization signals. The synchronization process of the one or more 3-D display devices has been described in detail in conjunction with FIG. 5.

The one or more 3-D display devices send a request, for synchronization, to the device manager 218 of the synchronization device 108. In an embodiment, the request includes a timestamp at which the request was generated by the one or more 3-D display devices. The device manager 218 analyzes the timestamp to determine the network lag of the communication medium 106. For example, the one or more 3-D display devices generate a request at $t=t_1$. The device manager 218 receives the request at $t=t_2$. The device manager compares the time instant of request generation and request reception to determine that communication medium 106 has a lag of $t_2-t_1$. The synchronization manager 216 generates and transmits a synchronization signal that causes the display device to offset frame switching by $t_2-t_1$ seconds to ensure that propagation delays are compensated and 3-D display device remain synchronized irrespective of network lags.

A person ordinarily skilled in the art would appreciate that steps 408-412 are performed in a scenario where the synchronization manager 216 does not transmit the synchronization signal periodically. In an embodiment, during continuous transmission of the synchronization signal, the compensation of network lag may be not required.

Figure 5:
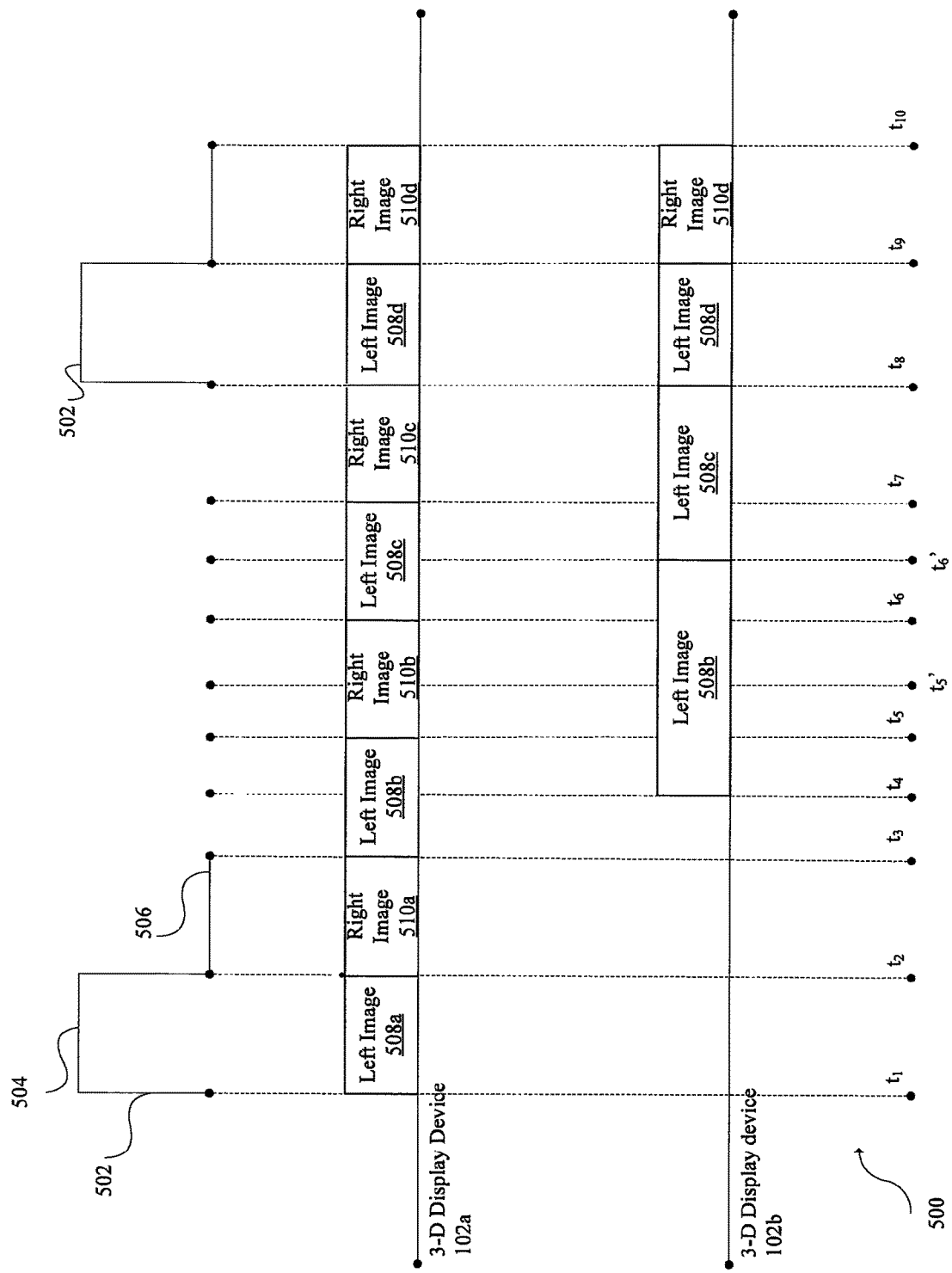
FIG. 5 is a timing diagram for synchronizing a 3-D display device in accordance with an embodiment.

FIG. 5 is a timing diagram 500 for synchronizing a 3-D display device 102b in accordance with an embodiment. The timing diagram 500 is described with respect to FIG. 1 and FIG. 2. The timing diagram 500 shows a waveform 502 (hereinafter referred to as ("synchronization signal") depicting an exemplary synchronization signal 112a transmitted by the synchronization device 108. As shown, the waveform 502 is transmitted between time instants $t_1$ and $t_3$. Further, as described with reference to FIG. 4a, the synchronization device 108 waits for a pre-defined time period before transmitting the synchronization signal 502 again. As shown, the synchronization signal 502 is not transmitted or present in the communication medium 106 between time instants $t_3$ and $t_8$. The predetermined time period (in step 406 of FIG. 4a) is $t_8-t_3$.

The 3-D display device 102b will not have any synchronization information until it receives the synchronization signal 502. The 3-D display device 102b starts displaying left image 508b corresponding to the current frame when it starts up at, say time $t_4$. At this point, the 3-D display device 102b does not have any synchronization information. At time $t_5$, when the 3-D display device 102b would normally transition to the image for the other eye, the 3-D display device 102b continues the displaying of the left image 508b for the same eye. At time $t_6$, when the 3-D display device 102b would transition to the next frame under its own timing signal, the device 102b displays the image for the next frame for the same eye as the image it is currently displaying (i.e. left image 508c of the next frame). At time $t_8$, when the 3-D Display device 102b receives the synchronization signal 502, the 3-D display device 102b transitions to the image corresponding to the timing of the synchronization signal 502. Therefore, at $t_8$, the 3-D display device 102b is synchronized with the synchronization signal 502. The 3-D display device 102b shows only the image for a single eye (e.g. left image) until the synchronization signal 502 is received ($t_4-t_8$). This prevents ghosting of content as seen by a user and the content is experienced in 2-D instead of a ghosted 3-D image. FIG. 5 also shows the frames displayed by 3-D display device 102a that is already synchronized with the synchronization signal 502.

In an alternate embodiment, the 3-D display device 102b may continue to display left image 508c between $t_8$ and $t_9$ if the 3-D display device 102b has not finished decoding image 508d by time $t_8$. Even if display device has a lag in decoding content frames and is showing a frame (or more) behind 102a, the synchronization of the display of images for the left and right eye is the same between 102b and 102a, which allows someone wearing a pair of shutter glasses to view the proper 3-D effect from both displays. Alternatively, 102b may be displaying content unrelated to the content being displayed by 102a (for example two separate sports games being shown).

It is to be noted that the frequency with which the 3-D viewing devices shutter is often higher than the frame rate of the 3-D content. In such a case, the image for each eye will be displayed multiple times for each frame. For example, instead of displaying images in the sequence—508a, 510a, 508b, 510b . . . , the 3-D display device 102b might display the images in the sequence—508a, 510a, 508a, 510a, 508b, 510b, 508b, 510b . . . or 508a, 510a, 508a, 510a, 508a, 510a, 508a, 510a, 508b, 510b, 508b, 510b, 508b, 510b, 508b, 510b.

Figure 6:
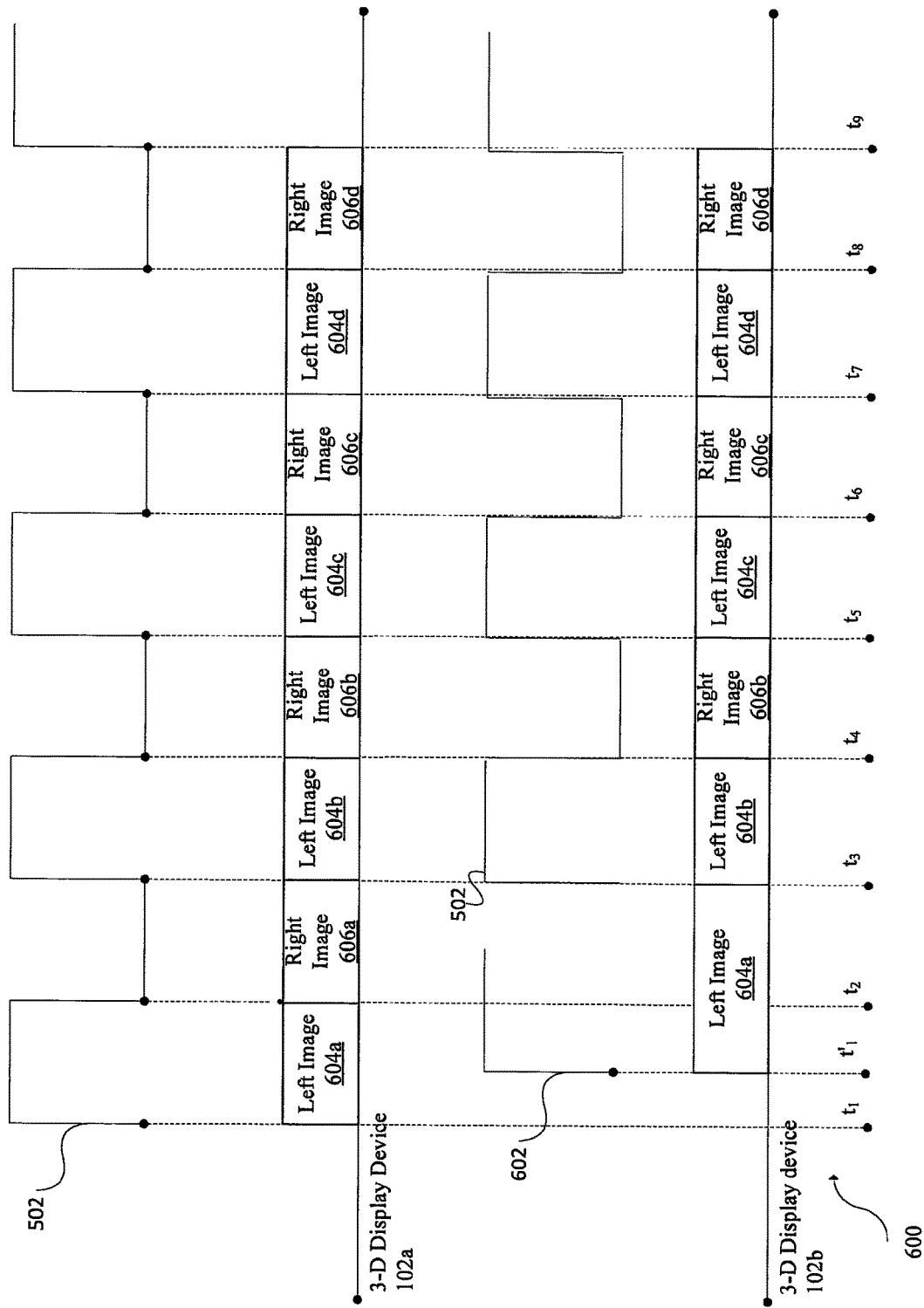
FIG. 6 is a timing diagram for synchronizing a slave 3-D display device with a master 3-D display device in accordance with an embodiment.

FIG. 6 is a timing diagram 600 for synchronizing a slave 3-D display device 102b with a master 3-D display device 102a in accordance with an embodiment. The timing diagram 600 is described with respect to FIG. 3 and FIG. 5.

The timing diagram 600 includes the synchronization signal 502, and a default synchronization signal 602 (specific to the 3-D display device 102b). The 3-D display device 102a displays the 3-D content in accordance with a first timing signal associated with the synchronization signal 502. On the other hand, the second 3-D display device 102b displays the 3-D content in accordance with a second timing signal associated with the default synchronization signal 602. For example, the first 3-D display device 102a displays the left frame 604a in a time interval between time instants $t_1$ and $t_2$. The second 3-D display device 102b displays the left image 604a between time instants $t'_1$ and $t_3$. Since, the 3-D display device 102b has not received any synchronization signal till this point; the 3-D display device 102b continues to display the left image 604a of the current frame between time instants $t'_1$ a $t_3$.

At time instant $t_3$, the 3-D display device 102b receives the synchronization signal 502. The synchronizer 322 of the 3-D display device 102b determines a difference between its internal timing signal (second timing signal) and the first timing associated with synchronization signal 502. In an embodiment, a digital phase locked loop in the synchronizer 322 may determine a phase difference between the first timing signal and the default timing signal of the second display device 102b. Such a digital phase locked loop adjusts the timing between the signals to reduce the phase difference to zero. The content processor 320 of the 3-D display device 102b continues to display the left image 604a for a time interval between time instants $t'_2$ and $t_3$. Thereafter, subsequent left image (604b) and the right image (606b) of the subsequent frame are displayed in accordance with the synchronization signal 502. Hence, the slave 3-D display device 102b synchronizes with the master 3-D display device 102a from time instant $t_3$.

Some of the disclosed embodiments can be implemented in, for example, a sports bar or a store that has multiple 3-D display devices. Each of the 3-D display devices may display different 3-D content at different timing signal. Further, each of the 3-D display devices may have at least one associated 3-D content viewing device. For utilizing the at least one 3-D content viewing device to view 3-D content on each of the 3-D display devices, each of the 3-D display devices display respective 3-D content in accordance with the same timing signal. Each of the plurality 3-D content viewing devices operates in synchronization with the common timing signal that is derived from a synchronization signal. Users of such 3-D content viewing devices or shutter glasses can enjoy a seamless 3-D viewing experience while viewing multiple 3-D display devices.

In an alternative embodiment, at least one of the 3-D display devices 102 includes a synchronization device 108. In such an embodiment, the 3-D display device may act as a master device. In an embodiment, the user interface 324 in the at least one 3-D display device may receive an input from a user to configure the 3-D display device as a master device. The synchronization device 108 (in the 3-D display device) generates a synchronization signal. Further, the synchronization device 108 transmits the synchronization signal to other 3-D display devices.

For example, a sports bar may have plurality of 3-D display devices. Each of the 3-D display devices 102 can communicate with the synchronization device 108 over the communication medium 106. Further, each of the 3-D display devices may communicate with each other in accordance with various communication protocols such as Bluetooth, NFC, and IR. The synchronization device 108 configures at least one of the 3-D display devices 102 (having the synchronization device 108 integrated there within) as the master display device. The master display device generates and transmits the synchronization signal to the slave 3-D display devices.

In certain scenarios, some of the slave 3-D display device might not receive the synchronization signal due to one or more reasons, such as, but not limited to, distance from the master 3-D display device or the synchronization device 108. Typically, such a scenario can arise when the synchronization device 108 transmits the synchronization signal via wireless medium. In such a case, the 3-D display devices that do not receive the synchronization signal can display the 3-D content in accordance with the default timing signal. In an embodiment, a wired network connection can cover a larger number of 3-D display devices spaced apart or installed in the sports bar. In another embodiment, one or more signal repeaters may be installed to relay the synchronization signal to 3-D display devices out of the coverage area of the synchronization device 108. In another embodiment, a plurality of synchronization devices 108 can be installed in the sports bar. In such an embodiment, one of the synchronization devices can act as a master synchronization device and the other synchronization devices can act as slave synchronization device.

The disclosed methods and systems, as described in the ongoing description or any of its components, may be embodied in the form of a computer system. Typical examples of a computer system include, but are not limited to, a general-purpose computer, a programmed microprocessor, a micro-controller, a peripheral integrated circuit element, and other devices or arrangements of devices that are capable of implementing the steps that constitute the method of the present disclosure. Embodiments disclosed herein, although described as being implemented as executable software, may be implemented in hardware, or a combination of hardware and software.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a customer through an input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks such as the steps that constitute the method of the present disclosure. The method and systems described can also be implemented using only software programming or using only hardware or by a varying combination of the two techniques. The disclosure is independent of the programming language used and the operating system in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the present disclosure. The software may also include modular programming in the form of object-oriented programming. The processing of input data by the processing machine may be in response to customer commands, results of previous processing or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The programmable instructions can also be transmitted by data signals across a carrier wave. The disclosure can also be embodied in a computer program product comprising a computer-readable medium, with the product capable of implementing the above methods and systems, or the numerous possible variations thereof.

While various embodiments have been illustrated and described, it will be clear that the disclosure is not limited to these embodiments only. Numerous modifications, changes, variations, substitutions, and equivalents will be apparent to those skilled in the art without departing from the spirit and scope of the invention as described in the claims.

The invention claimed is:

1. An apparatus, comprising:
   one or more processors configured to:
      generate a reference signal based on content displayed on at least one of a plurality of 3-D display devices;
      generate a synchronization signal based on the reference signal, wherein the synchronization signal is utilized by the plurality of 3-D display devices to synchronously display the content, wherein the reference signal is different from the synchronization signal,
      wherein a glasses control signal, that one of the plurality of 3-D display devices transmits to at least one of a plurality of 3-D content viewing devices, is monitored to generate the synchronization signal; and
      transmit the synchronization signal to the at least one of the plurality of 3-D display devices based on a request for the synchronization signal, wherein the request is received from the at least one of the plurality of 3-D display devices.

2. The apparatus of claim 1, wherein the one or more processors are in the at least one of the plurality of 3-D display devices.

3. The apparatus of claim 1, wherein the glasses control signal is utilized by the plurality of 3-D content viewing devices to synchronize with the at least one of the plurality of 3-D display devices.

4. The apparatus of claim 1, wherein the one or more processors are further configured to transmit the synchronization signal to the at least one of the plurality of 3-D display devices periodically.

5. The apparatus of claim 1, wherein the one or more processors are further configured to register at least one master 3-D display device from the plurality of 3-D display devices, wherein the at least one master 3-D display device is configured to generate and transmit the synchronization signal to 3-D display devices other than the at least one master 3-D display device in the plurality of 3-D display devices.

6. The apparatus of claim 5, wherein the one or more processors are further configured to configure the at least one master 3-D display device to generate and transmit a plurality of glasses control signals to the plurality of 3-D content viewing devices.

7. The apparatus of claim 1, wherein the reference signal is derived based on images obtained from a visual detector positioned to image the at least one of the plurality of 3-D display devices.

8. The apparatus of claim 1, wherein the synchronization signal corresponds to a rate of switch between left images and right images associated with a plurality of frames of the content displayed on the plurality of 3-D display devices.

9. A first display device, comprising:
   one or more processors configured to:
      transmit a request for a synchronization signal to a synchronization device;
      receive the synchronization signal from the synchronization device, wherein the synchronization device transmits the synchronization signal based on the request,
      wherein the synchronization signal is generated based on a reference signal, wherein the reference signal is generated based on content displayed on the first display device;
      wherein a glasses control signal, that the first display device or a second display device transmits to at least one of a plurality of 3-D content viewing devices, is monitored to generate the synchronization signal;
      determine a first timing signal based on the synchronization signal;
      display the content based on the first timing signal; and
      based on a lack of reception of the synchronization signal, display the content based on a default timing signal.

10. The first display device of claim 9, wherein the content includes a left image and a right image of each of a plurality of frames in the content, wherein the first timing signal corresponds to an instant of switch between the left image and the right image of each of the plurality of frames in the content.

11. The first display device of claim 9, wherein the one or more processors are further configured to:
   based on a reception of the synchronization signal, synchronize with the plurality of 3-D content viewing devices based on the first timing signal; and
   based on the lack of reception of the synchronization signal, synchronize with the plurality of 3-D content viewing devices based on the default timing signal.

12. The first display device of claim 11, wherein the one or more processors are further configured to generate and transmit the synchronization signal based on the first display device that is configured as a master synchronization device.

13. The first display device of claim 9, wherein based on the lack of reception of the synchronization signal, the one or more processors are further configured to transmit the glasses control signal to the plurality of 3-D content viewing devices based on the default timing signal.

14. The first display device of claim 9, wherein the one or more processors are further configured to detect the glasses control signal based on the lack of reception of the synchronization signal.

15. The first display device of claim 14, wherein based on the lack of reception of the synchronization signal, the one or more processors are further configured to determine the first timing signal based on the glasses control signal.

16. A method, comprising:
generating a reference signal based on content displayed on at least one of a plurality of 3-D display devices;
generating a synchronization signal based on the reference signal, wherein the synchronization signal is utilized by the plurality of 3-D display devices for synchronously displaying content, wherein the reference signal is different from the synchronization signal,
wherein the synchronization signal is generated by monitoring a glasses control signal that one of the plurality of 3-D display devices transmits to at least one of a plurality of 3-D content viewing devices; and
transmitting the synchronization signal to the at least one of the plurality of 3-D display devices based on a request for the synchronization signal, wherein the request is received from the at least one of the plurality of 3-D display devices.

17. The method of claim 16, further comprising designating at least one master 3-D display device from the plurality of 3-D display devices, wherein the at least one master 3-D display device is configured to generate and transmit the synchronization signal to 3-D display devices other than the at least one master 3-D display device in the plurality of 3-D display devices.

18. The method of claim 16, wherein a timing signal associated with the synchronization signal corresponds to an instant of switch and a rate of switch between left images and right images associated with a plurality of frames of the content displayed on the plurality of 3-D display devices.

19. A system, comprising:
one or more processors configured to:
generate a reference signal based on content displayed on at least one of a plurality of 3-D display devices;
generate a synchronization signal based on the reference signal, wherein the synchronization signal is utilized by the plurality of 3-D display devices to synchronously display the content,
wherein a glasses control signal, that one of the plurality of 3-D display devices transmits to at least one of a plurality of 3-D content viewing devices, is monitored to generate the synchronization signal; and
transmit the synchronization signal to the at least one of the plurality of 3-D display devices based on a request for the synchronization signal, wherein the request is received from the at least one of the plurality of 3-D display devices; and
the plurality of 3-D display devices configured to:
based on a reception of the synchronization signal, display the content based on a first timing signal associated with the synchronization signal; and
based on a lack of reception of the synchronization signal, display the content based on a default timing signal.

20. The system of claim 19, wherein the content includes at least one left image and at least one right image, wherein the first timing signal and the default timing signal correspond to an instant of switch and a rate of switch between the at least one left image and the at least one right image associated with the content displayed on the plurality of 3-D display devices.

* * * * *